United States Patent [19]
Barlow

[11] Patent Number: 5,204,961
[45] Date of Patent: Apr. 20, 1993

[54] COMPUTER NETWORK OPERATING WITH MULTILEVEL HIERARCHICAL SECURITY WITH SELECTABLE COMMON TRUST REALMS AND CORRESPONDING SECURITY PROTOCOLS

[75] Inventor: Douglas C. Barlow, Redmond, Wash.

[73] Assignee: Digital Equipment Corporation, Maynard, Mass.

[21] Appl. No.: 543,164

[22] Filed: Jun. 25, 1990

[51] Int. Cl.$^5$ ............................................. H04L 9/00
[52] U.S. Cl. .................................. 395/725; 395/600; 395/500; 395/775; 380/25; 380/4
[58] Field of Search ............... 395/600, 725, 800, 775, 395/500; 380/4, 25

[56] References Cited

U.S. PATENT DOCUMENTS

| | | | |
|---|---|---|---|
| 4,184,200 | 1/1980 | Wagner et al. | 380/25 |
| 4,918,653 | 4/1990 | Johri et al. | 395/650 |
| 4,919,545 | 4/1990 | Yu | 380/25 |
| 4,926,476 | 5/1990 | Covey | 380/4 |
| 5,032,979 | 7/1991 | Hecht et al. | 395/650 |

OTHER PUBLICATIONS

"Extending Mandatory Access Controls to a Networked MLS Environment", 1989, pp. 1–10.
"Commercial IP Security Option", Winger, Oct. 4, 1989, pp. 1–5.
Colorado Networks Division, BI Security Extensions to RIP, Nov. 1989.

*Primary Examiner*—Thomas C. Lee
*Assistant Examiner*—L. Donaghue
*Attorney, Agent, or Firm*—Flehr, Hohbach, Test, Albritton & Herbert

[57] ABSTRACT

A computer network has a number of computers coupled thereto at distinct nodes. A trust realm table defines which computers are members of predefined trust realms. All the members of each predefined trust realm enforce a common set of security protocols for protecting the confidentiality of data. Each computer that is a member of a trust realm enforces a predefined security policy, and also defines a security level for each set of data stored in the computer. Thus, each message has an associated label denoting how to enforce the computer's security policy with respect to the message. A trust realm service program prepares a specified message for transmission to a specified other computer system. To do this it uses the trust realm table to verify that both the computer system and the specified computer system are members of at least one common trust realm, and then selects one of those common trust realms. The message is transmitted as a protocol data unit, which includes a sealed version of the message, authenticated identifiers for the sending system and user, the message's label, and an identifier for the selected trust realm. Received protocol data units are processed by validating each of the components of the received protocol data unit before accepting the sealed message in the protocol data unit as authentic. Further, the label in the received protocol data unit is used by the receiving computer to determine what predefined security policy is to be enforced with respect to the message.

14 Claims, 4 Drawing Sheets

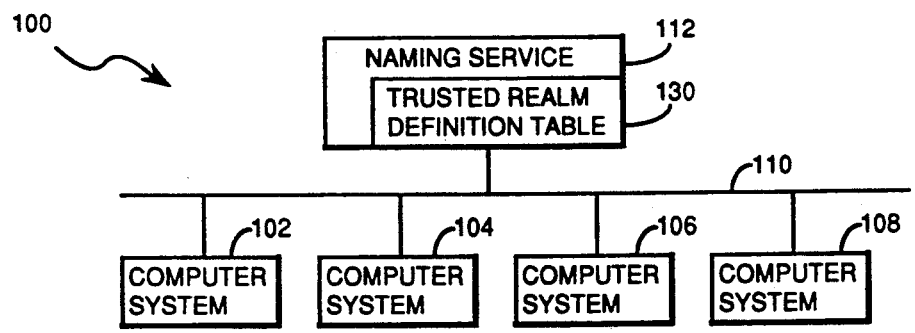
FIGURE 1
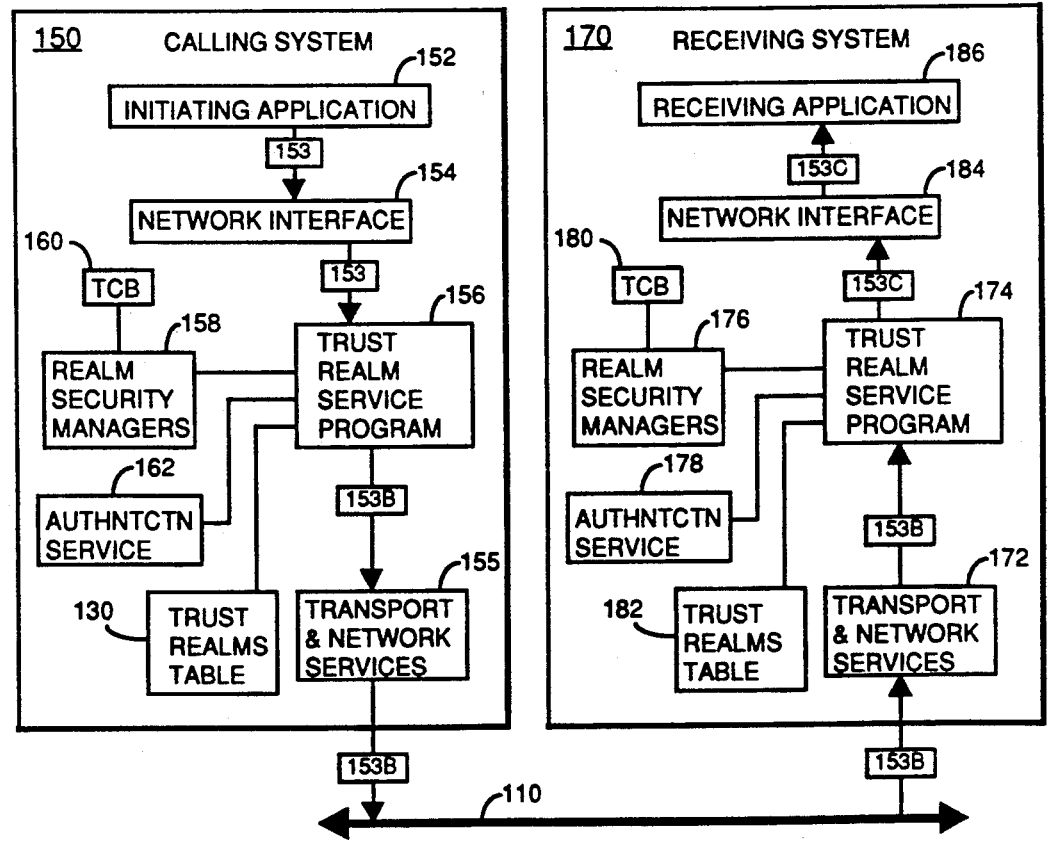
FIGURE 2
FIGURE 3

| | WHEN ESTABLISHING ASSOCIATION | WITH ESTABLISHED ASSOCIATION |
|---|---|---|
| S E A L E D | TRUST REALM 252 | ASSOCIATION REFERENCE 257 |
| | DATA LEVEL SECURITY LABEL IN FORMAT FOR TRUST REALM 254 | SEALED CHANGED ENVIRONMENT VALUES 258 |
| | OTHER SECURITY RELATED INFORMATION 256 | |
| SENDING SYSTEM AUTHENTICATION 262 | | |
| SENDING USER AUTHENTICATION 266 | | |
| SEALED USER MESSAGE 268 | | |

COMPUTER NETWORK OPERATING WITH MULTILEVEL HIERARCHICAL SECURITY WITH SELECTABLE COMMON TRUST REALMS AND CORRESPONDING SECURITY PROTOCOLS

The present invention relates generally to maintaining security within a distributed computer system or network, and particularly to methods and systems for maintaining security where the physical media interconnecting the computers in a distributed system are not secure.

BACKGROUND OF THE INVENTION

Maintaining security within a distributed computer system or network has historically been a problem. Security in such systems has several aspects, including: (1) authentication of the identities of users and systems involved in a communication, (2) secure transmission of information, and (3) requiring the system and user which receive secure communications to following predefined protocols so as to preserve the confidentiality of the transmitted information.

In many military computer systems, security is ensured by verifying that all the computer hardware, including communications lines used to interconnect computers, is physically secure. In most commercial situations, however, physically secure computer hardware and communications lines are not practical. Therefore security for these commercial applications must be provided using mechanisms other than physical security.

There are a number of publicly available techniques for providing reliable authentication of users (actually, named members) in a distributed network, including RSA Public Key authentication, and Needham & Schroeder's trusted third-party authentication technique (used in Kerberos, which is a trademark of MIT, from MIT's Project Athena).

However, in many computing environments, knowledge of only the user's identity is not sufficient information in order to determine whether access to specific data should be allowed. In many cases, additional information is needed to make that decision. This additional information may take many forms, such as where the user's workstation is located (e.g., whether it is in a secure area), or what secrecy level the user is operating under at the current time. This additional information is referred to as the "environment" in which the user is running. For example, both military and commercial computer systems use the concept of "levels" of security. Basically, a number of distinct security levels are needed in many systems because some information is more confidential than other information, and each set of confidential information has an associated set of authorized recipients.

The users participating in a communication cannot be trusted to always correctly represent the environment in which they are running. Instead, secure communications require that the computer operating system supporting a user's process must be responsible for communicating information about the user's environment to other systems in the network.

The present invention helps to provide secure communications between systems by providing a mechanism for ensuring that communications occur within "trust realms" of systems, and also by authenticating both the systems and users which are participating in a communication. Furthermore, multiple levels of security are supported by transmitting validated security level labels along with data that is being transmitted, with the labels being encoded so that the recipient can verify that the specified security level label is authentic.

SUMMARY OF THE INVENTION

In summary, the present invention is a computer security system which strengthens the basis for trust between computers which are exchanging messages using a network not physically secure against interlopers. To do this, the present invention provides a trust realm table that defines which computers are members of predefined trust realms. All the members of each predefined trust realm enforce a common set of security protocols for protecting the confidentiality of data.

Each computer that is a member of a trust realm enforces a predefined security policy, and also defines a security level for each set of data stored in the computer. Thus, each message has an associated label denoting how to enforce the computer's security policy with respect to the message.

A trust realm service program in each computer is charged with the task of labelling and formatting users' messages for transmission to specified other computer systems. The trust realm service program is part of the computer's kernel or operating system and is normally invisible to the users of the system unless they try to breach the computer system's security policies by trying to transmit data to another computer that is not a member of a trust realm shared by the user's computer.

Before transmitting a specified message, the trust realm service program uses the trust realm table to verify that both the local computer system and the specified target computer system are members of at least one common trust realm, and then selects one of those common trust realms. If the computer system and the specified computer system are not both members of at least one common trust realm, the message is not transmitted because transmission of the message is not authorized - because the specified target computer cannot be trusted to enforce the sending computer's security policies.

If the two computers are members of a common trust realm, the message is transmitted as a protocol data unit, which includes a sealed version of the message, authenticated identifiers for the sending system and user, the message's security level label, and an identifier for the selected trust realm.

Received protocol data units are processed by validating each of the components of the received protocol data unit before accepting the sealed message in the protocol data unit as authentic. Further, the security level label in the received protocol data unit is used by the receiving computer to determine what predefined security policy is to be enforced with respect to the message.

BRIEF DESCRIPTION OF THE DRAWINGS

Additional objects and features of the invention will be more readily apparent from the following detailed description and appended claims when taken in conjunction with the drawings, in which:

FIG. 1 is a block diagram of a computer network coupled to a number of separate computer systems.

FIG. 2 depicts one embodiment of a trust realm table.

FIG. 3 is a block diagram of two computers, interconnected by a network, one of which is transmitting data to the other.

FIG. 5 is a block diagram of the data structure for messages transmitted from one computer to another.

DESCRIPTION OF THE PREFERRED EMBODIMENT

Figure 4A:
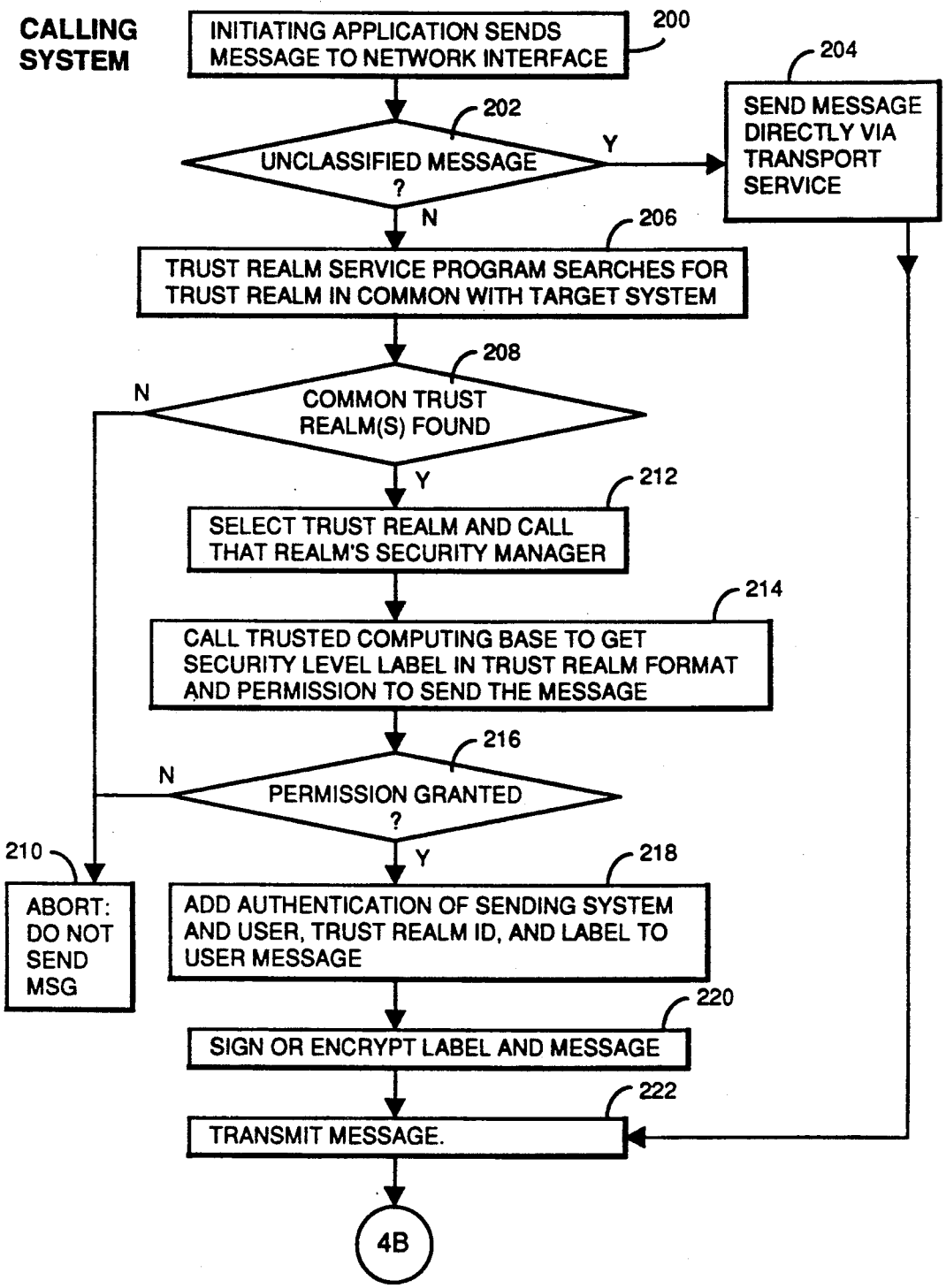
FIGS. 4A and 4B are flow charts of the secure data transmission method of the present invention.

Referring to FIG. 1, the present invention is a security protocol system, or security protocol technique which typically operates in the context of a collection 100 of computers 102-108 interconnected by a local or wide area network 110 or some other communications medium. Each of these computers 102-108 is said to be located at a distinct node of the networked computer system 100.

Each computer 102-108 contains the standard computer system components, including a data processing unit, system bus, random access memory RAM, read only memory (ROM), mass storage (e.g., magnetic or optical disks), a user interface (e.g., keyboard, monitor and printer) and communications ports. These physical computer components (not shown) are not modified by the present invention and are therefore not described in detail herein.

One item that is used in one preferred embodiment of the present invention is a secure "naming service" 112 that is accessible to all the computers 102-108 via the network. The naming service 112 is essentially a simple database management system which maintains a set of data that can be relied upon as being accurate by all the users of the network 100. In the context of the present invention, the naming service 112 contains listings of "trust realms", the meaning of which will be explained in more detail below. The naming service 112 is said to be secure because its contents (and delivery thereof) are protected from modification by unauthorized sources, which allows recipients of data from the naming service 112 to know that they can rely on the information obtained therefrom. There are a number of practical problems involved in the construction of secure naming services, and therefore other embodiments of the present invention may use an alternate scheme for denoting trust realms.

TRUST REALMS

A central concept used by the present invention is that of "trust realms." A trust realm is a collection of computer systems which share a common security policy, and trust one another to maintain that policy. Furthermore, the computer systems that are members of a trust realm have an agreed upon method of communicating an "environmental label" or "security level label" associated with each message transmitted between systems.

Basically, a trust realm is a known set of computers that can be trusted to properly handle confidential information, and to follow a predefined set of rules (called a security policy) for handling such data.

A single computer can be a member of a plurality of distinct trust realms. The reason for having more than one trust realm is so that a computer system can utilize different security policies when transmitting data to various different computers. More simply, different organizations tend to use different security policies for handling confidential information, and there is one trust realm for each such security policy. For instance, a military organization may organize data into different levels of secrecy, including "sensitive", "secret", "top secret" and so on. On the other hand, a commercial organization might organize data into security levels such as: "officers only", "board of directors only", "managerial info", "all employee info", "special project A", and so on. Each security policy defines how data that is labelled with a particular security level label is to be handled, and thus for each security policy there is a predefined set of security level labels.

Referring to FIG. 2, the naming service 112 maintains a defined list of trust realms. This list is organized as a flat file or database table 130, with one row 132 for each computer system that is a member of at least one trust realm. The row or record for a particular specified computer system lists all the trust realms which that system belongs to. There are two preferred embodiments of this table 130.

In the embodiment shown in FIG. 1, there is a secure naming service 112 which contains the trust realm table 130. The advantage of this embodiment is that the security manager in charge of maintaining the trust realm table needs to store only one copy of the trust realm table 130, which is then available for every one to use. The disadvantage is that it is difficult to design a secure naming service. A second embodiment of the trust realm table 130 is simply to include a copy of the table in every computer system which is a member of at least one trust realm. This has the obvious disadvantage of requiring that updates to the table be copied into all these computer systems in a way that is safe and secure. However, this second embodiment has the advantage of being relatively easy to implement.

GLOSSARY

The following are definitions of terms used herein.

ASSOCIATION. An association is formed between two computers when the present invention has successfully exchanged authentication, trust realm, and environmental information describing the calling and target users. This exchange allows the two systems to form a common security context describing the environment shared between two users. The association allows a sending system to refer to this previously established security context when sending any additional messages between the users, rather than reauthenticating the sending user and his environment all over again.

AUTHENTICATED MESSAGE. Authenticated data is data which has been either encrypted or signed using authentication techniques which allow the origin (i.e., the sender) of the data to be validated. "Signing" a message (i.e., a set of data) is similar to physically signing a letter or a check, in that the signature validates the authenticity of the signed document (or set of data). The signing of digital messages in computer systems is performed using authentication techniques, a number of which are used in prior art computer systems for validating various types of data transmissions. In the context of the present invention, messages and the associated information sent along with messages (including sending system and user identifiers, trust realm identifier, and label) are all authenticated so as to allow the receiving system to verify that the received data was in fact sent by the alleged sending system. The source of a message or other set of data can be authenticated by either signing with a digital signature, or by encrypting the message using a key shared only with a previously established source. Details of data authentication, signing, encryption and decoding are not discussed herein because these topics are well known to those skilled in the art. These prior art techniques are used as tools by the present invention to implement portions of the present invention's trust realm security methodology.

ENVIRONMENT and LABEL. In most commercially available computer systems that have internal security protection, all data stored in the computer is tagged or labeled with so-called "environment" information, which is indicative of the security characteristics of the process in the computer that created that data. In this document, the terms "security level" and "environment" are used interchangeably to refer to those characteristics of a user which are pertinent to the security policy or policies used by the computer.

TARGET. A target system or a target application is the system or application to which communication is directed by a calling system or user.

SECURITY POLICY. A security policy is a set of rules which determine the availability of data to individual computers and/or users, along with accompanying rules specifying actions that must be taken upon providing or denying access data by a specified computer or user. In many cases, these rules are dependent on factors other than the identities of the computers and users to whom the data is being sent. In particular, the environment or security level labels associated with transmitted data often determine how the transmitted data is to be handled.

MESSAGE HANDLING

Referring to FIG. 3, the basic situation in which the invention operates is as follows. A user running on a first computer 150, herein called the calling system, wants to send a message to a specified user running on a specified second computer 170, herein called the target or receiving system. FIG. 3 shows the various software modules that are involved in the transmission of this message. These software modules include security mechanisms which determine whether transmission of the message is allowed, how the message is to be encoded, and what security protocols are to be used during transmission of the message as well as after receipt of the message.

Referring to the block diagram in FIG. 3 and the flow chart in FIG. 4A, the transmission process begins when an initiating application 152 in the calling system 150 generates a message 153 and sends it to the calling system's network interface 154 with instructions that the message is to be sent to a specified user (or application program) running on a specified computer (step 200 in FIG. 4A). The network interface 154 is the boundary between the potentially untrusted user program and the trusted networking programs within the computer system.

If the calling computer system 150 had no security mechanisms for controlling the flow of messages into and out of the computer 150, the network interface 154 would directly send the message 153 to the computer's transport service routine 155, which handles the actual transmission of data over a network. The transport service routine 155 handles the protocols associated with data transmission over a particular type of network, such as Internet's TCP or UDP, ISO's Connection Oriented or Connectionless Transport Services, or whatever underlying networking protocol stack is being used. Each such network has a predefined sequence of actions which must be performed in order to successfully transmit a message to a specified destination, and the details of that protocol are handled by the transport service routine 155.

In some embodiments of the present invention, there is a special provision for "unclassified data", which is data that the computer's internal security system denotes as being unrestricted by security protocols. If the calling computer system 150 has such a provision, and the message being sent is unclassified (step 202), then the message is transmitted without further processing (step 204). In other embodiments of the invention, no provision is made for special handling of "unclassified data" because all the computer systems on the relevant computer network require that all transmitted data be treated as being confidential, or at least as having an associated data security level.

Assuming that the message is either classified for security purposes or that the calling system does not have unclassified data, the message 153, now in the trusted, or protected, part of the computer system, is next processed by a trust realm service program (TRSP) 156. The TRSP's first job is to determine whether the calling system and the target system are both members of a shared trust realm (steps 206 and 208). This is done by retrieving from the trust realm table 130 (1) the set of trust realms associated with the target system and (2) the set of trust realms associated with the calling system. Note that if the target system is not listed in the trust realm table 130, this means that it is not a member of any trust realms. If the two systems are not both members of a common trust realm (or, alternately stated, if the target system is not a member of any of trust realms of which the calling system is a member) then the message transmission sequence is aborted and the message is not sent (step 210). Basically, if there isn't a common trust realm for the two systems, transmission of the message is unauthorized and therefore the message is not sent.

Next, the TRSP 156 must select a trust realm from among the set of trust realms of which both the calling and target systems are members (step 212). If there is only one common trust realm, then that is selected; otherwise one of the trust realms must be selected. The method of making this selection will depend on security considerations that are not relevant to the present invention, but generally the trust realms will either be prioritized in terms of which should be selected when more than one common trust realm exists, or the selection of a trust realm will depend on the characteristics of the message which is being sent. Once a trust realm is selected, the TRSP 156 calls the selected trust realm's security management program 158.

A trust realm security management program 158 is the program responsible for enforcing the security policies of a particular trust realm. It handles data security level labels in accordance with a predefined set of rules for the trust realm and interacts with the trusted computing base 160 to obtain the local data security level labels associated with messages that are being sent. It also interacts with the trusted computing base 160 so that the data security level labels on received messages can be converted back into the format associated with the computer's local data security level labels.

A trusted computing base 160 is that part of a computer system which is responsible for maintaining the computer's local security policy. This means that it maintains the confidentiality of data stored in the system and prevents unauthorized data sharing between users and processes running on the computer. The trusted computing base 160 is therefore responsible for assigning security level labels or environmental information to processes running on the computer and to the data that is created or stored by those processes.

Next, the trust realm security management program 158 calls upon the trusted computing base (TCB) 160 to determine the environment or data security level label associated with the initiating application 152 (i.e., associated with the message that is being transmitted). Note that since a number of different types of computers may share a trust realm, the internal formats used to denote local data security level labels may vary from computer to computer within a trust realm. Therefore, if necessary, the trust realm security management program 158 converts the local data security level label used by the calling computer 150 into another format that is used by the trust realm for transmitting data security level labels (step 214). If the TCB 160 approves of sending message 153 (step 216), then the permission and new format label are returned to the TRSP 155. Otherwise, permission is denied, the message transmission sequence is aborted and the message is not sent (step 210). The trust realm security management program 158 may also perform any checks required by the trust realm which are not normally done by the local TCB 160.

Assuming permission to send the message was obtained from the TCB 160, the message to be sent is now converted into a new format so as to include authenticated identifiers for the calling system and user, the trust realm, and also to include a security level label (step 218). The next step after that is to authenticate the message so that the receiving system 170 can validate the received message (step 220). More specifically, the calling system and user are authenticated, the trust realm identifier and security level label are signed under the system authentication, and the user message is signed under the user authentication. Authentication and signing are performed by having the trust realm service program 156 call an authentication service program 162 which signs specified sets of data so as to validate the source of the signed data. In some embodiments the signed data will be encrypted so that interlopers monitoring network traffic will not be able to determine the content of the messages being transmitted. The resulting data structure for the transmitted message 153B, shown in FIG. 5, is then sent to the calling computer's transport service module 155 for transmission over a communications network 110 to the target computer system 170 (step 222). The data structure shown in FIG. 5, generally known as a protocol data unit 250, contains protocol control information 251, which includes the trust realm being used 252, the data security level label denoted in the format associated with the trust realm 254, and any other information 256 needed to specify the protocols to be used when handling the data at the received computer system (all of which are signed values). This information is "sealed", which means that it is either encrypted or signed using the authentication service program 162. Authentication information for the calling system 262 and user 266 may also be present. Once an association has been established between two computer systems, this information can be abbreviated by sending a reference to the existing association 257, if necessary, and those aspects of the security level label which have changed 258 since the association was established. The message data structure also includes a service data unit 260 which contains the user's "sealed message" (i.e., a message which has either been encrypted or signed) 268.

Figure 4B:
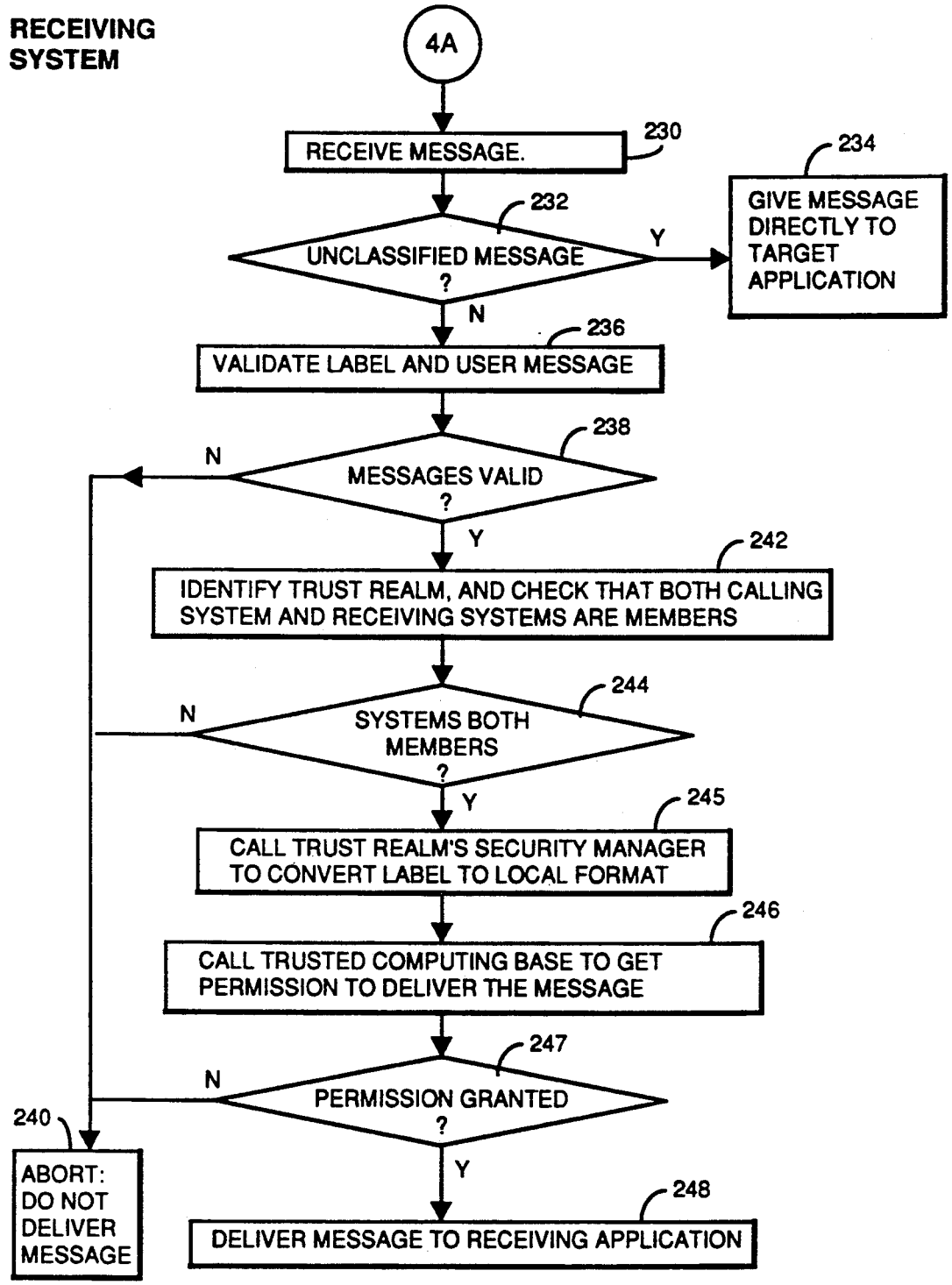

Referring to FIG. 4B, when the transmitted message is received (step 230) at the receiving system 170, the received message 153B is processed as follows. Unclassified messages that are transmitted outside the trust realm security protocols are recognized as such (step 232), and are routed by the trust realm service program 174 directly to the receiving application 186 via network interface 184 (step 234), without performing the validation steps described below.

Assuming that the received message 153B is not unclassified, the received message is first sent by the receiving computer's transport service routine 172 to that computer's trust realm service program 174 for validation. The trust realm service program 174 validates the received message by calling the receiving system's authentication service program 178 (step 236).

If any part of the message (i.e., the transmitted protocol data unit) is not validated by the authentication service 178 (step 238), the message delivery process is aborted and the received message is discarded (step 240). Failure to validate the message means that either the alleged sender did not send this message (i.e., it is a message from an interloper posing as the sending system), or that some portion of the message was changed by an interloper during the transmission process.

If the sending and receiving system identifiers are successfully validated, this means that the alleged sending system did in fact send the message, and that the sending system intended the receiving system to be the target system. Furthermore, the security level label for the message is validated and therefore known to be valid.

The receiving system's TRSP 174 then checks the trust realm table 182 to determine whether the identified sending system is a member of the trust realm specified by the received message 153B and whether the receiving system is also in that trust realm (steps 242 and 244). If not, then the message was improperly transmitted, and the message is discarded as being unauthorized for receipt by this system 170 (step 240).

Assuming that the trust realm check is successful (step 244), the received security level label is then passed to the appropriate trust realm security manager 176 to be converted, if necessary, into the format used by the receiving computer's trusted computing base 180 (step 245). The trust realm security manager 176 then checks with the TCB 180 to get permission to deliver the labelled message to the target application (step 246). If permission is not granted (step 247), then the message is not delivered (step 240). Otherwise control of the validated message, including its security level label, is transferred back to the trust realm service program 174.

Finally, if the message has passed all these tests, the message portion of the converted message 153C (which is identical to the originally sent message 153) is transmitted via the network interface 184 to the receiving application 186 (step 248).

ESTABLISHING AN ASSOCIATION

When all the trust realm and security level label information has been validated (steps 236, 238, 242 and 244), this information is stored in the receiving system, thereby establishing an association with the sending system. The establishment of an association enables more efficient data transmission by allowing the sending system to eliminate those portions of the protocol control information 251 (see FIG. 5) which have not changed since the last message sent between the two systems. Furthermore, failure to establish an association automatically results in rejection of the received message because the received message has not been proven to be authentic. In the preferred embodiment, associations are automatically terminated after a predefined period of time if not renewed by the continued transmission of data between the two systems.

ALTERNATE EMBODIMENTS

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. In a computer network having a multiplicity of computers coupled thereto, message transmission apparatus comprising:

trust realm defining means for storing information denoting which ones of said computers are members of predefined trust realms; wherein for each predefined trust realm there is a corresponding predefined security protocol, enforced by all of each said predefined trust realm's members, for protecting confidentiality of data transmitted between said members of said each predefined trust realm; and security apparatus in each of a plurality of said computers, comprising:

a trusted computing base which enforces a predefined security policy in said computer and which defines a security level for each set of data stored therein;

authentication means for authenticating and validating messages sent to another computer via said network;

each said message comprising data having an associated label denoting how said trusted computing base is to enforce security policy with respect to said message;

trust realm service means, coupled to said trusted computing base, authentication means and trust realm defining means, for preparing a specified message for transmission to a specified other computer system, including means for obtaining trust realm information stored by said trust realm defining means, verifying that both said computer system and said specified computer system are members of at least one common trust realm, and selecting a trust realm from among said at least one common trust realm, authenticating said message and said label associated with said message, and transmitting to said specified other computer a protocol data unit including said authenticated message and label, and an identifier that identifies said selected trust realm;

said trust realm service means further including:

means for receiving protocol data units transmitted by other ones of said computers via said network, means for validating the message and label in each protocol data unit received by said computer, and means for processing said label and said message in said received protocol data unit in accordance with the predefined security protocol corresponding to the selected trust realm identified by said identifier in said received protocol data unit.

2. The message transmission apparatus set forth in claim 1, said trust realm service means including means for aborting transmission of a message when, according to said information stored in said trust realm defining means, said computer and said specified other computer are not members of a common trust realm.

3. The message transmission apparatus set forth in claim 1, said trust realm service means including means for conveying said label in said received protocol data unit to said trusted computing base;

said trusted computing base including means for enforcing a predefined security policy with respect to said message in said received protocol data unit in accordance with said label.

4. The message transmission apparatus set forth in claim 1, said trusted computing base in at least a plurality of said computers including means for enforcing a plurality of predefined security protocols with respect to received protocol data units, each predefined security protocol corresponding to one of said predefined trust realms; wherein one of said plurality of predefined security protocols is applied by said trusted computing base to each received protocol data unit in accordance with the selected trust realm identified by said identifier in said each received protocol data unit.

5. The message transmission apparatus set forth in claim 1, said trust realm service means including means for including with each transmitted protocol data unit a source identifier that identifies the computer sending said transmitted protocol data unit;

said trust realm service including means for authenticating said source identifier and said selected trust realm identifier;

said protocol data unit including said authenticated source identifier and authenticated selected trust realm identifier; and said means for validating messages received by said computer including means for validating each of said components of a received protocol data unit before accepting said sealed message in said protocol data unit as authentic.

6. The message transmission apparatus set forth in claim 1, said trust realm service means including means for including with each transmitted protocol data unit a source identifier that identifies the computer sending said transmitted protocol data unit;

said trust realm service including means for authenticating said source identifier and said selected trust realm identifier, and for sealing said message and its label;

said protocol data unit including said authenticated source identifier, said authenticated selected trust realm identifier, and said sealed message and label; and said means for validating messages received by said computer including means for validating each of said components of a received protocol data unit before accepting said sealed message in said protocol data unit as authentic.

7. The message transmission apparatus set forth in claim 6, said trust realm service means including means for sealing said selected trust realm identifier that is including with each transmitted protocol data unit.

8. In a computer network having a multiplicity of computers coupled thereto, a method of enforcing security protocols when transmitting messages between computers via said network, the steps of the method comprising:

storing information denoting computers which are members of predefined trust realms; wherein all the members of each predefined trust realm enforce a common set of security protocols for protecting confidentiality of data;

authenticating and validating a specified message that an application running in a computer is attempting to send to a specified other computer via said network, each said message comprising data having an associated label denoting how a predefined security policy is to be enforced with respect to said message;

said authenticating and validating steps including the steps of:

accessing said stored trust realm information, verifying that both said computer system and said specified computer system are members of at least one common trust realm, and selecting a trust realm from among said at least one common trust realm;

authenticating said message and its associated label;

transmitting to said specified other computer a protocol data unit including said authenticated message and label, and an identifier that identifies said selected trust realm;

receiving said protocol data unit at said specified other computer;

validating the message and label in said received protocol data unit before accepting said message and label in said protocol data unit as authentic; and processing said label and said message in said received protocol data unit in accordance with the predefined security protocol corresponding to the selected trust realm identified by said identifier in said received protocol data unit.

9. The method of enforcing security protocols when transmitting messages between computers as set forth in claim 8, including the step of aborting transmission of a message when, according to said stored trust realm information, said computer and said specified other computer are not members of a common trust realm.

10. The method of enforcing security protocols when transmitting messages between computers set forth in claim 8, including the step of enforcing a predefined security policy with respect to said message in said received protocol data unit in accordance with said label in said received protocol data unit.

11. The method of enforcing security protocols when transmitting messages between computers set forth in claim 8, in at least a plurality of said computers, enforcing a plurality of predefined security protocols with respect to received protocol data units, each predefined security policy corresponding to one of said predefined trust realms; wherein the predefined security policy enforced with respect to each received protocol data unit corresponds to the selected trust realm identified by said identifier in said each received protocol data unit.

12. The method of enforcing security protocols when transmitting messages between computers set forth in claim 8, said authenticating step including authenticating a source identifier that identifies the computer sending said transmitted protocol data unit, and authenticating said selected trust realm identifier for said protocol data unit;

said transmitting step including transmitting as part of each transmitted protocol data unit said authenticated source identifier and said authenticated selected trust realm identifier; and said validating step including validating all authenticated components of a received protocol data unit before accepting said message in said protocol data unit as authentic.

13. The method of enforcing security protocols when transmitting messages between computers set forth in claim 8, said authenticating step including authenticating a source identifier that identifies the computer sending said transmitted protocol data unit, said authenticating said selected trust realm identifier for said protocol data unit;

said method further including the step of sealing said message and its label;

said transmitting step including transmitting as part of each transmitted protocol data unit said sealed message and label, said authenticated source identifier and said authenticated selected trust realm identifier; and said validating step including validating all authenticated components of a received protocol data unit before accepting said messages in said protocol data unit as authentic.

14. The method of enforcing security protocols when transmitting messages between computers set forth in claim 13, further including:

sealing said selected trust realm identifier that is including with each transmitted protocol data unit.

* * * * *

UNITED STATES PATENT AND TRADEMARK OFFICE
CERTIFICATE OF CORRECTION

PATENT NO. : 5,204,961
DATED : April 20, 1993
INVENTOR(S) : Douglas C. Barlow

It is certified that error appears in the above-identified patent and that said Letters Patent is hereby corrected as shown below:

Column 12,
Line 36, delete the second occurrence of "said" and insert therefor -- and --
Line 48, delete "messages" and insert therefor -- message --

Signed and Sealed this

Twenty-eighth Day of June, 2005

JON W. DUDAS
*Director of the United States Patent and Trademark Office*